Oct. 25, 1932.    I. D. PERRY    1,884,834
DOOR PILLAR AND THE LIKE
Filed Sept. 16, 1931    2 Sheets-Sheet 2
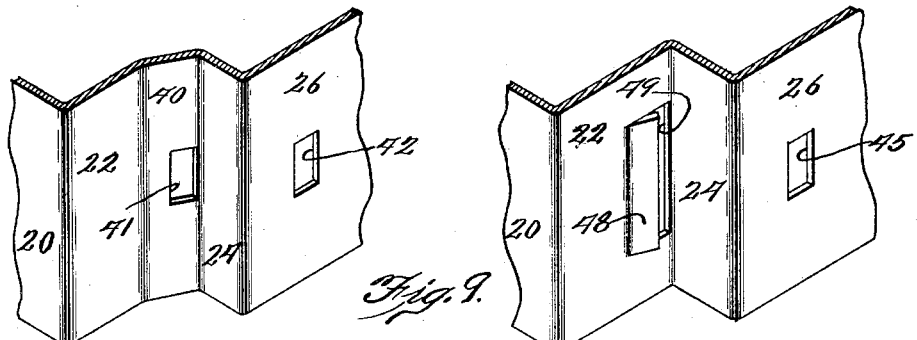
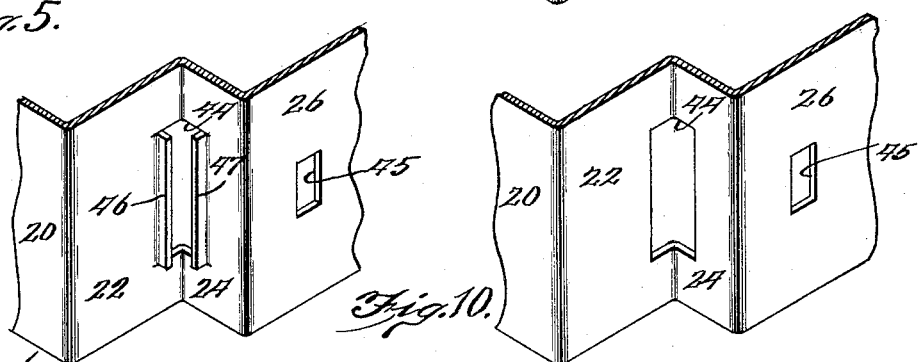
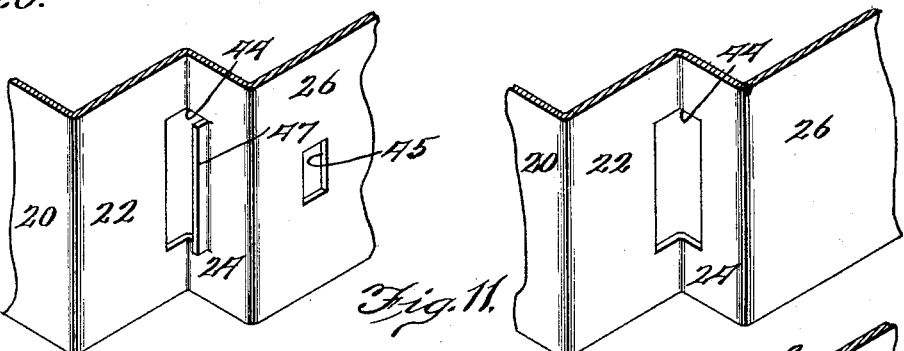
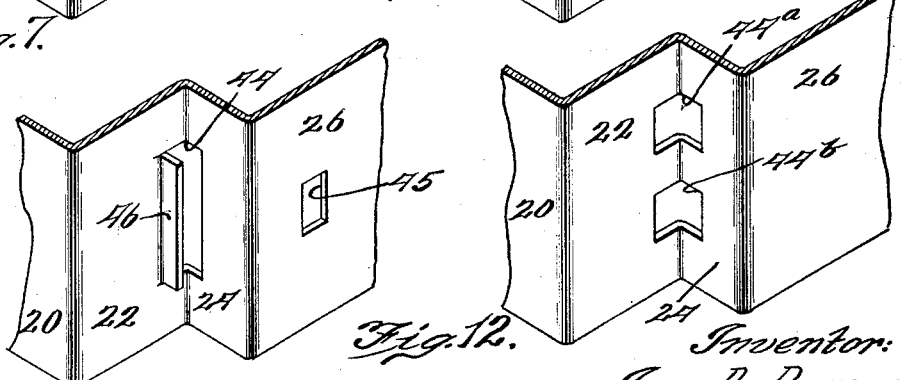

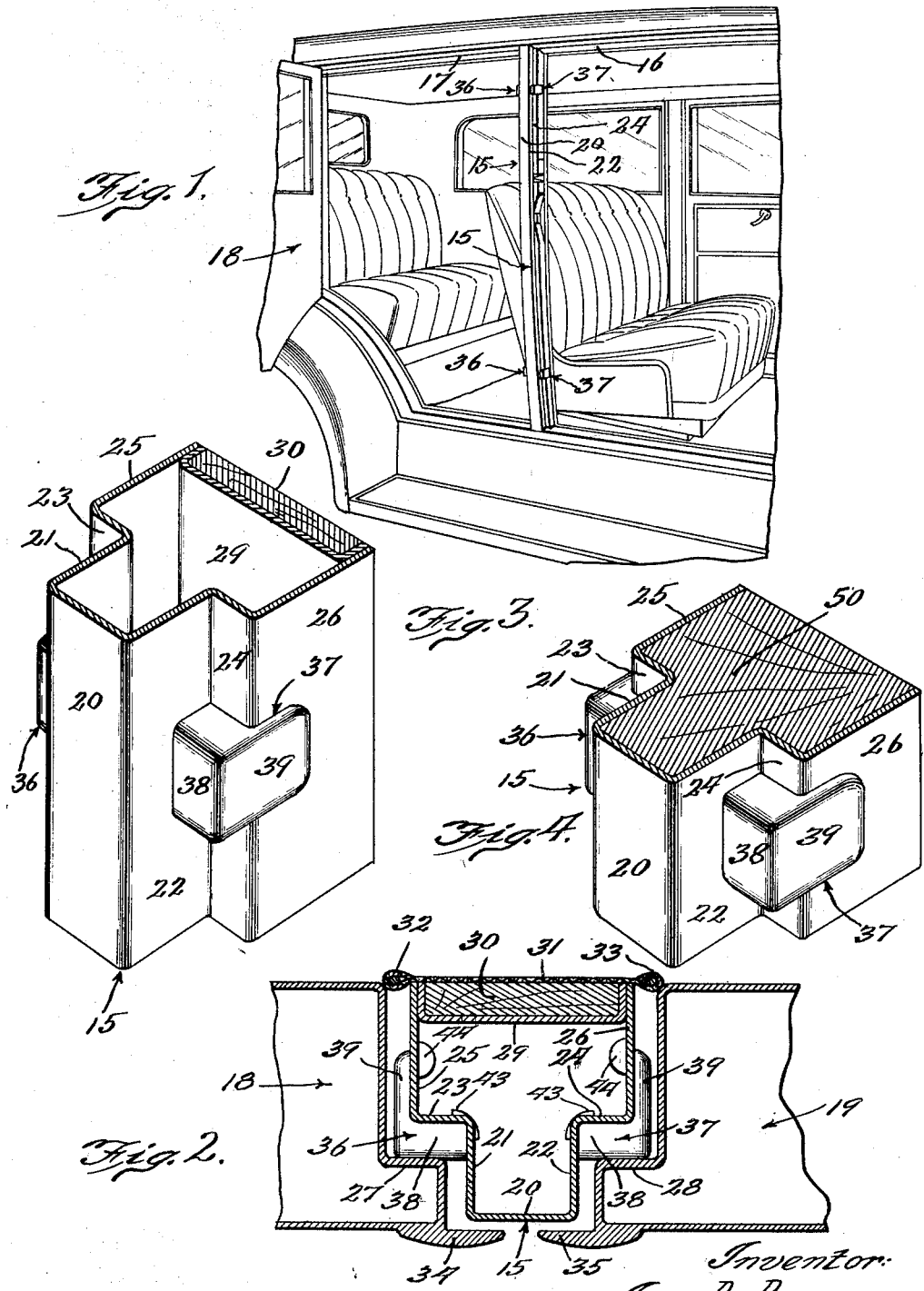

Patented Oct. 25, 1932

1,884,834

UNITED STATES PATENT OFFICE

IRA D. PERRY, OF CHICAGO, ILLINOIS, ASSIGNOR TO EDNA L. MEYER, OF ROCKFORD, ILLINOIS

DOOR PILLAR AND THE LIKE

Application filed September 16, 1931. Serial No. 563,061.

This invention has to do with improvements in door pillars and the like for automobile bodies. These door pillars are built into and constitute a portion of the automobile body and establish a portion of the door frame against which the swinging portion of the door comes into contact when the door is closed. In other words the door pillar is located at the locking or latching edge portion of the door.

Furthermore in the case of a great majority of automobile bodies constructed there are provided two doors at each side of the body, and the door pillar is located between these doors and it forms the portion of the body located at such point. In such case both of the doors swing towards and latch or lock to this common door pillar.

It is also customary to provide the door pillar with a rabbeted or recessed outwardly facing ledge portion which establishes a ledge facing outwardly towards the exterior of the body and towards the door. Likewise the edge portion of the door itself is provided with an inwardly facing rabbeted or ledged portion which is a companion to that of the door pillar, so that when the door is closed these two companion edge portions seat together or in close proximity to each other. In other words the door pillar has a ledge surface which faces outwardly in the direction of door closing movement and the door pillar also has an inwardly extending flange surface at the door side of the pillar and which lies parallel to the direction of door closing movement. Generally also the door pillar is provided with an outwardly extending flange surface lying parallel to the direction of door closing movement. The edge portion of each door is provided with companion surfaces including a ledge facing also in the direction of door closing movement and which approaches the corresponding ledge of the door pillar when the door is closed.

Generally speaking it may be stated that the door pillar is of T-shaped cross section in the case of automobile bodies having two doors closing against an intermediate pillar, and is of L-shaped cross section in the case of automobile bodies having only a single door closing against the pillar.

It is also customary to provide the door pillar with one or more bumper blocks on the ledge which faces in the direction of door closing movement, said bumper blocks being of resilient material such as rubber or the like. In the past it has been customary to provide the door pillar with a socket or recess which is cut into or reaches into both the ledge and the inner or inwardly extending flange whereby said socket or recess has exposures both towards the direction of door closing movement on the ledge surface and also parallel to the direction of door closing movement in the flange surface. In the past it has been customary to set the resilient bumper block into such socket or recess, said bumper block being of proper size and formation to extend beyond the ledge surface towards the companion door surface and to extend beyond the flange surface so as to provide a wiping portion against which the companion portion of the door will engage when the door is closed.

The foregoing arrangement is objectionable for the reason among other things that the cutting or recessing of the ledge surface at the position of the bumper block makes it impossible to directly support the bumper block at that location so that it becomes necessary to make other or supplemental provision for supporting the bumper block and sustaining it against the shocks and forces incident to the door closing operation. Such supplemental supporting means involves additional parts or operations of manufacture with corresponding added expense and possibility of derangement in service.

The main object of the present invention is to provide a sheet metal door pillar which is so formed as to provide the ledge facing in the direction of door closing movement and also the inwardly and outwardly extending flanges lying parallel to the direction of door closing movement, and to provide said sheet metal door pillar with openings at the interior or acute angle between the ledge and the outwardly extending flange, which opening or openings are so formed as to receive companion portions of the bumper block itself to retain the bumper block securely in place on the door pillar; and in some cases to also provide the inwardly extending flange of the door pillar with a opening or openings to receive companion lugs or the like of a lip or skirt of the bumper block lying parallel to the direction of door closing movement and overlying said inwardly extending flange. In each case the arrangement of the openings in the door pillar is such as to leave the ledge which faces in the direction of door closing movement substantially uncut or unperforated to thereby establish a large supporting surface for the head portion of the bumper block. This supporting surface is of substantially the full area or size of the head portion looking in the direction of door closing movement so that the entire pressure and shock on the head of the bumper block incident to the door closing operation is transmitted directly through the resilient material of the bumper block to the pressure and shock resisting ledge portion of the door pillar.

A further desirable result of this arrangement is that the strength and stiffness of the door pillar is maintained at a maximum amount consistent with the necessary attachment of the bumper block to the pillar since the opening or openings at the interior angle and/or inwardly extending flange need be only of such size as is required to receive the lug or lugs by means of which the bumper block is held in place; it being unnecessary to provide a socket or recess of the full size of the body portion of the bumper block.

In some cases it is also the present practice to provide a filler of wood or the like for all or a portion of the door pillar so as to stiffen and reinforce the same. In such cases the sheet metal serves as a finishing plate or sheathing for such wooden pillar. In the case of this type of construction the wooden or other filler may be suitably socketed or recessed at the proper position corresponding to the lugs whereby the bumper block is secured in place.

A further advantage of the type of construction herein disclosed is the fact that the openings in the sheet metal door pillar can be readily formed by punching or other operations at the same time that the sheet metal is folded into the form of the door pillar or by operations incidental thereto so that the entire door pillar construction including the means for attaching the bumper blocks in place is produced at a minimum of cost and with a minimum number of operations and without the necessity of using welding or other objectionable manufacturing operations.

Other objects and uses of the invention will appear from a detailed description of the same which consists in the features of construction and combinations of parts hereinafter described and claimed.

In the drawings:

Figure 1 shows a fragmentary perspective view of a portion of an automobile body having applied thereto a door pillar embodying the features of the present invention, the construction illustrated being that in which both doors work against a common T-shaped door pillar, both of the doors being opened so as to better illustrate the construction of the door pillar itself;

Figure 2 shows a fragmentary horizontal section through a T-shaped door pillar embodying the features of the present invention together with the adjacent portions of the two doors, said doors being closed;

Figure 3 shows a perspective view of a short length of a T-shaped door pillar of the type shown in Figures 1 and 2;

Figure 4 shows a view similar to that of Figure 3 with the exception that it illustrates a wooden filled T-shaped door pillar construction; and Figures 5 to 12 inclusive show short perspective views of portions of 8 different forms of sheet metal door pillars each embodying the features of the present invention.

Referring first to Figures 1 and 2, the same illustrate a typical application of the embodiment of the present invention. In this case the door pillar is designated in its entirety by the numeral 15. It is located intermediate between the front and rear door openings 16 and 17 respectively and serves the doors of both of these openings. A portion of the rear door 18 is shown in Figure 1 and portions of both of the doors are shown at 18 and 19 in Figure 2.

As shown in Figure 2 the door pillar 15 is of sheet metal including the cross plate portion 20, the two outwardly extending flanges 21 and 22 lying in the direction of door closing movement, the two ledges 23 and 24 facing in the direction of door closing movement and the two inwardly extending flanges 25 and 26 lying parallel to the direction of door closing movement. The swinging edge portions of the doors 18 and 19 are provided with the ledges 27 and 28 respectively which face in the direction of door closing movement and directly approach the door pillar ledges 23 and 24.

As a matter of convenience a U-shaped sheet metal plate 29 has its flanges seated between flanges 25 and 26 of the door pillar at the body side thereof; and a filler block 30 of wood or the like is placed into the channel 29. The fabric 31 is then readily secured to the filler block 30 and the lips 32 and 33 at the edges of said fabric 31 overlie the flanges 25 and 26 of the door pillar and thus establish sealing lips through which the inner corners of the doors 18 and 19 seat and seal when the doors are closed.

Generally also the outer edges of the doors are provided with the overhanging lips 34 and 35 at the swinging edges of the doors so that said lips approach the door pillar and cover over the clearances between the edges of the doors and the outwardly extending flanges of the door pillar.

In the construction illustrated I have shown L-shaped bumper blocks 36 and 37 as being mounted upon the two sides of the door pillar in position to receive contact by the edge portions of the doors when they are closed. Each of these bumper blocks includes a head portion 38 which seats against the ledge 23 or 24 as the case may be and a lip or skirt 39 which seats against an inwardly extending door pillar flange 25 or 26 as the case may be.

Referring to Figures 5 to 12 inclusive, the same show fragmentary perspective views of portions of typical door pillar constructions showing the manner in which the same are perforated or provided to take the attaching portions of the bumper blocks. In the construction of Figure 5 there is a connecting angle 40 at the inner angle between the ledge 24 and the outwardly extending flange 22. The same is provided with an opening 41 and the inwardly extending flange is provided with an opening 42 in transverse alignment with the opening 41; and the head portion of the bumper block 37 is provided with a hooked lug or projection 43 which reaches through the opening 41 and the lip or skirt of the bumper block is provided with a hooked projection 44 which reaches through the opening 42 of the flange 26. In this way the bumper block is held in place on the pillar and at the same time the ledge 24 of the pillar is substantially uncut and is provided with a full or continuous supporting surface for the head portion of the bumper block.

In the modified construction of Figure 6 there is provided an opening 45 at the inner angle between the ledge 24 and the outwardly extending flange 22; and there is also provided an opening 45 in the inwardly extending flange 26 in transverse alignment with the opening 44. There are also provided the lips or lugs 46 and 47 struck out from the material of the flange 22 and ledge 24 respectively at the position of the opening 44 and serving as means for engaging corresponding openings of the bumper block so as to assist in locking the same in place.

The modified construction of Figure 7 is similar to that just described. However in the present case the lug or flange 46 has been eliminated. Likewise the construction of Figure 8 is similar to those of Figures 6 and 7; but in the present case the lug or flange 47 has been eliminated and 46 has been retained.

In the modified construction of Figure 10 both of the lugs or flanges 46 and 47 have been eliminated leaving only the opening 44 at the position of the inner angle between the ledge 24 and the outwardly extending flange 22; and in the construction of Figure 11 the same is also true, besides which the opening 45 of the inwardly extending flange 26 has been eliminated. The modified construction of Figure 12 is similar to that just described, but in the present case the opening 44 has been divided into two shorter and disconnected sections 44$^a$ and 44$^b$.

The modified construction of Figure 9 is similar to that of Figure 8; but in the present case the lug or ear 48 on the outwardly extending flange 22 at the position of the opening therein is formed on an acute angle instead of at right angles thereto; and furthermore the opening 49 in the outwardly extending flange 22 terminates at the apex of the angle between the ledge 24 and the flange 22 so that said opening does not reach over into the ledge 24 to any extent whatsoever. In this connection it will also be noted that even in the other cases herein illustrated and described the openings 44 do not reach into the ledge 24 far enough to materially reduce the strength thereof or reduce the supporting surface of the said ledge for supporting the head portion of the bumper block.

In the construction shown in Figures 2 and 3 the filler block 30 does not reach far enough over to interfere with the inwardly extending hooked lugs on the lips or skirts of the bumper blocks. In the modified construction of Figure 4 the filler block 50 completely fills the space within the sheet metal door pillar so that said filler block should be properly recessed at the positions where the lugs of the bumper block extend through the sheet metal in order to permit proper engagement of the parts.

While I have herein shown and described only certain embodiments of the features of my present invention still I do not intend to limit myself thereto except as I may do so in the claims.

I claim:

1. A pillar for an automobile body comprising a sheet metal member bent to provide a ledge portion facing in the direction of door closing movement, and an inwardly projecting flange portion substantially at right angles thereto, one of said portions having an opening provided therein, a lug being formed on said portion by bending sheet metal therefrom to form the opening, said pillar portion being adapted to receive a bumper block thereon with a portion thereof entered in the opening and engaging the lug, the other portion of said pillar having an opening provided therein in a predetermined relation to the aforesaid opening and lug to permit fastening the bumper block to the pillar by means engaging in said opening.

2. A pillar for an automobile body comprising a sheet metal member bent to provide a ledge portion facing in the direction of door closing movement, and an inwardly projecting flange portion substantially at right angles thereto, one of said portions having an opening provided therein elongated lengthwise of the pillar, an elongated lug being formed on said portion by bending sheet metal therefrom to form the opening, said pillar portion being adapted to receive a bumper block thereon with a portion thereof entered in the opening and engaging the lug, the other portion of said pillar having an opening provided therein in a predetermined relation to the aforesaid opening and lug to permit fastening the bumper block to the pillar by means engaging in said opening.

3. A pillar for an automobile body comprising a sheet metal member bent to provide inwardly and outwardly projecting flanges and a rabbet of angular cross-section at the junction of said flanges, the rabbet comprising a ledge wall facing in the direction of door closing movement and disposed substantially at right angles to the inwardly projecting flange, and a back wall disposed substantially at right angles to the outwardly projecting flange, said rabbet having an opening provided therein elongated lengthwise of the pillar in at least one wall of the rabbet, there being an elongated lug in the rabbet and bent from the wall thereof to form the opening, the rabbet being adapted to receive a bumper block resting on the ledge with a portion entered in the opening and engaging the lug, one of the aforesaid flanges of said pillar having an opening provided therein in a predetermined relation to the aforesaid opening whereby to permit fastening the bumper block to the pillar by means entering said opening.

IRA D. PERRY.